Patented Jan. 28, 1930

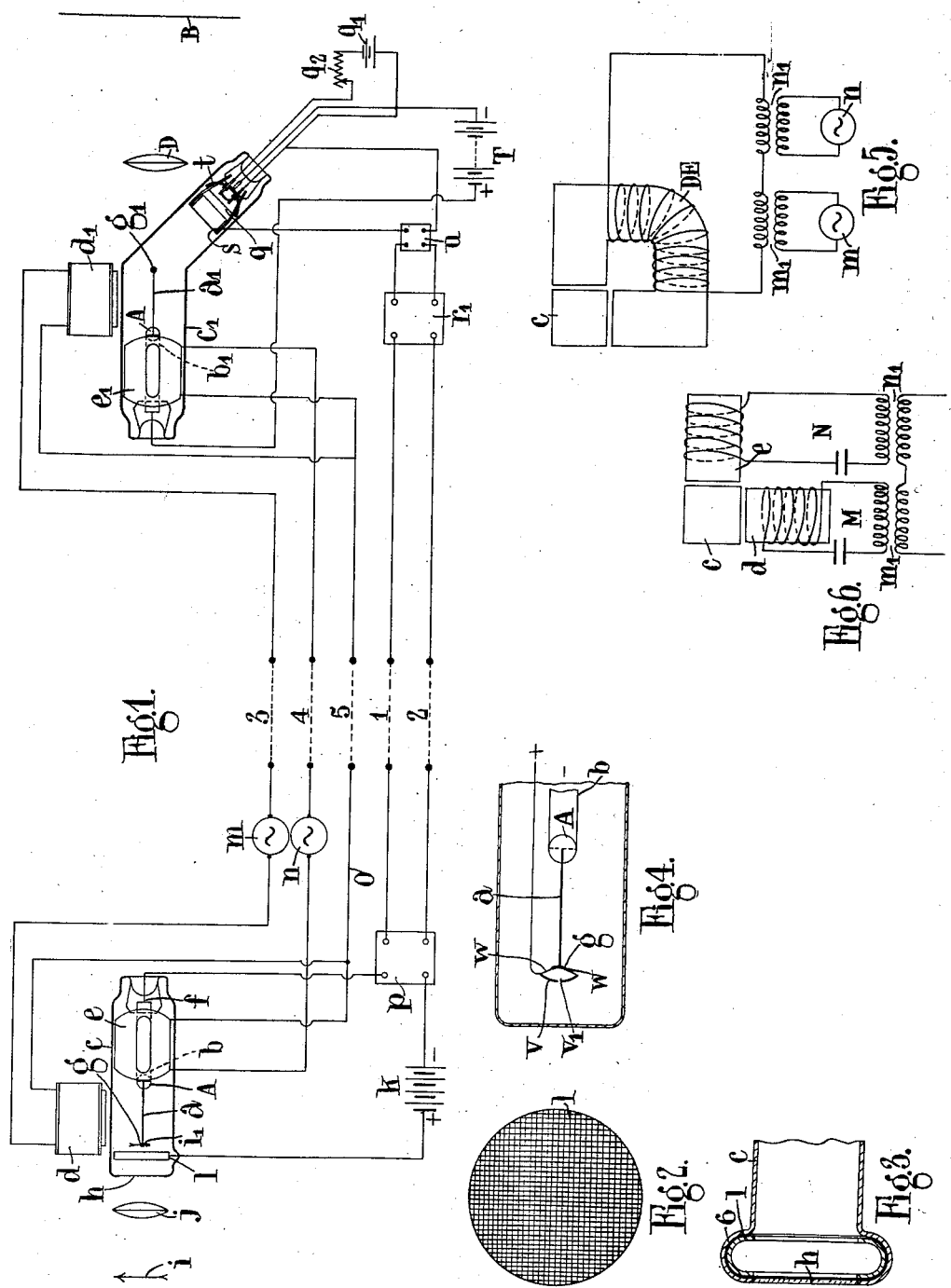

1,745,029

UNITED STATES PATENT OFFICE

BORIS RTCHEOULOFF, OF LONDON, ENGLAND

TELEVISION AND TELEPHOTOGRAPHY

Application filed February 9, 1927, Serial No. 167,045, and in Russia June 27, 1922.

This invention relates to an improved method of and apparatus for transmitting and receiving stationary or moving images, pictures or the like by electrical means, the transmission at a distance being effected over electrically conducting wires or through the intermediary of electro-magnetic waves.

One main feature of the present invention consists in causing a photo-electrically sensitized point or small surface provided at the transmitting end to vibrate in two directions at right angles to one another and scan a projected image, the said vibrating photo-electrically sensitized point or surface forming part of a photo-electric cell and the variations of the photo-electric current produced as a result of the different intensities of illumination of the different points of the image being transmitted in a known manner to the receiving end.

Another main feature of the invention consists in causing a fluorescent or luminescent point or small surface provided at the receiving end to vibrate in two directions at right angles to one another in synchronism with the vibrations of the photo-electrically sensitized point or small surface provided at the transmitting end and its fluorescence or luminescence to be varied in accordance with the variations of the photo-electric current.

The invention also broadly consists in providing the photo-electrically sensitized point or small surface or the fluorescent or luminescent point, at the end of a spring arranged to vibrate in one plane, the other end of which spring being attached to another spring arranged to vibrate at right angles to the plane in which the first spring vibrates.

According to a modification, the free end of the spring, more particularly at the transmitting end, is provided with a mirror which reflects the points of the images onto the walls of a tube or casing within which the springs are mounted, which walls are coated with a photo-electric substance.

The invention is illustrated by way of example in the accompanying diagrammatic drawings, in which Figure 1 is a diagram of the general arrangement according to the invention;

Figure 2 is an elevation of a modification of the positive electrode used in the transmitting apparatus;

Figure 3 is a sectional elevation through a modification of the positive electrode and part of the vacuum tube used in the transmitting apparatus;

Figure 4 is a sectional elevation of a further modification of the vacuum tube used at the transmitting end and Figures 5 and 6 are two further diagrams illustrating modifications of the method of energizing the electromagnets operating upon the springs.

In carrying the invention into effect according to one mode, two flat springs $a$ and $b$ connected end to end are mounted within a vacuum tube $c$, preferably of rectangular cross section, and two electromagnets $d$ and $e$, arranged outside the said vacuum tube cause the said two springs to vibrate in two planes at right angles to one another. The end $f$ of the spring $b$ is fixed in the interior of the tube $c$ whilst the free end $g$ of the spring $a$ is coated with a photo-electrical substance and faces a transparent opening $h$ of the tube. The image $i$ to be transmitted is projected preferably through a lens $j$ or other suitable optical system into the tube and the photo-electrically sensitized free end $g$ of the spring $a$ vibrates so as to scan the image $i_1$ projected into the tube. The photo-electrically sensitized end $g$ is electrically connected to the negative pole of the source of current $k$ and another electrode $l$ mounted within the tube $c$ is connected to the positive pole of the source of current, the said photo-electric substance and electrode constituting together a photo-electric cell.

The two electromagnets $d$, $e$, are energized by alternating or interrupted currents in such a manner as to cause the spring $a$ to vibrate at a substantially higher rate than the spring $b$, the periodicity of the two currents being for instance 1000 and 10 respectively. In Figure 1, $m$ and $n$ are two alternating current machines supplying currents of different frequencies to the respective electromagnets $d$ and $e$ each of which may be provided in pairs. Use may be made of a single electromagnet DE as shown in Figure 5 energized by currents of different frequencies received from the machines $m$ and $n$ through the transformers $m_1$ $n_1$. According to a further modification, the single electromagnet has a single pole arranged to face the spring which is intended to oscillate at the higher frequency, its winding being energized by the two frequencies. According to a still further modification, as illustrated in Figure 6, the two electromagnets $d$, $e$, are energized by means of tuned circuits M and N which are excited in any well-known manner through the intermediary of transformers $m_1$ and $n_1$.

The fluctuations of the photo-electric current are transmitted at a distance either through the intermediary of electrically conducting wires, as indicated by the interrupted lines 1 and 2, or by means of electro-magnetic waves, preferably after the photo-electric currents have been suitably amplified at the transmitting end by means of an amplifier $p$.

At the receiving end the photo-electric currents are arranged to control the cathode rays or stream of electrons emitted by an incandescent cathode $q$ or the like heated by a source of current $q_1$ over a variable resistance $q_2$, preferably in a device $c_1$ working on the same principle as a thermionic tube. The tube comprises in addition to the incandescent cathode and grid $s$, a spring arrangement similar to that referred to in connection with the transmitting apparatus with the exception that the free end $g_1$ of the compound spring $a_1$, $b_1$, is provided with a fluorescent or luminescent point. This spring acts as the anode. $t$ is a reflector which is connected to the negative pole of the high-tension battery T. Two electromagnets $d_1$, $e_1$, (or pairs of electromagnets) are used in conjunction with the compound spring, one of the electromagnets controlling the vibrations in one direction and the other electromagnet the vibrations in a direction at right angles to the direction of the vibrations controlled by the first electromagnet. These two electromagnets are electrically connected over the lines 3, 4 and return conductor 5, with the corresponding electromagnets $d$, $e$, provided at the transmitting end and are energized by the alternating or interrupted currents which flow through the latter electromagnets so that the two springs at the receiving end vibrate in synchronism with the two springs at the transmitting end.

The photo-electric currents reaching the receiving end are preferably amplified through an amplifier $r_1$ and finally rectified by a rectifier $u$ before they reach the grid $s$ which controls the stream of electrons emitted by the incandescent cathode $q$ and bombarding the fluorescent or luminescent end $g_1$ of the spring.

The anode $l$ provided at the transmitting end may be of rectangular shape as shown in Figure 1, or of disc or plate shape, in the latter case being made meshed in such a manner (see Figure 2) as to allow the passage of the rays of light into the interior of the tube. It is, however, to be understood that any other form of anode may be used, such as for instance a ring of semi-circular cross-section as shown in Figure 3, the front end $b$ of the tube $c$ being correspondingly shaped.

The photo-electric sensitive end $g$ of the spring may be in the form of a point or in the form of a small surface which may be concave, as shown in Figure 4, flat or convex, and may be used with a diaphragm $v$ interposed between the photo-electric surface $g$ and the transparent end $h$ of the tube $c$ through which the rays of light penetrate therein, the said diaphragm being provided with one or more perforations such as $v_1$ of any desired size to allow the rays of light to reach the photo-electric surface $g$. The diaphragm is convex, but of course it may be made flat or concave and be used in conjunction with any of the above mentioned small surfaces $g$ covered with the photo-electric substance. The diaphragm $v$ may also be made of metal and constitute the second electrode, viz: anode of the photo-electric cell, as indicated in Figure 4. In all these combinations of photo-electric surface and diaphragm, the latter may be arranged to be stationary or moved together with the photo-electric point or surface, care being however taken that the diaphragm when made of metal should not make electric contact with the photo-electric surface or the metallic parts which are connected thereto. In Figure 4, $w$ are insulating members by means of which the diaphragm $v$ is connected to and supported by the photo-electric surface $g$.

It is to be understood that any part of the tube may be coated with the photo-electric substance including the back part thereof. It is also to be understood that either the front or the back surface of the diaphragm above referred to or both may be covered with a photo-electric substance. Further the diaphragm may be so formed as to act as a reflector.

The springs $a$, $b$, $a_1$ and $b_1$, which are preferably flat and arranged to lie with their planes at right angles to one another are secured together through the intermediary of a ball A, which is provided on opposite faces with two incisions at right angles to one another to receive the said springs. The natural frequencies of the said springs both at the transmitting end and at the receiving end correspond to the two different frequencies of the currents flowing through the two electromagnets.

According to a modification, currents of one and the same periodicity are sent through all the electromagnets but the natural frequencies of the two springs are made to be for instance 10 and 1000 respectively.

The reproduction of the image at the receiving end may be projected onto a screen B, such as through the intermediary of a magnifying lens D or other optical system or be photographed.

The method of television hereinbefore described may be used in combination with any known system of telephony so that the images may be reproduced simultaneously with speech or music.

I wish it to be understood that the details for carrying the invention into effect may be modified in various respects without in any way departing from the spirit of the invention.

What I claim is:

1. A method of electrically transmitting images, consisting in projecting an image into the interior of a photo-electric cell, vibrating a small surface within the photo-electric cell in two directions at right angles to one another so as to scan the whole of the projected image and causing the said small surface to vary the current of the photo-electric cell according to the light that falls upon the said small surface during its vibrations.

2. A method of electrically transmitting images consisting in projecting an image into the interior of a photo-electric cell, vibrating a small photo-electrically sensitized surface within the photo-electric cell in two directions at right angles to one another so as to scan the whole of the projected image, whereby the said small photo-electrically sensitized surface causes the current of the photo-electric cell to vary according to the light that falls upon it during its vibrations.

3. An apparatus for electrically transmitting images, comprising a photo-electric cell and a mechanically vibrating device within the photo-electric cell, the said device being capable of vibrating in two directions at right angles to one another and of causing the currents of the photo-electric cell to fluctuate according to the light that falls upon a particular small surface of the vibrating device during its vibrations.

4. An apparatus for electrically transmitting images, comprising a photo-electric cell, a compound spring mounted within the said cell, which compound spring is constituted by two flat springs connected together in alignment with one another but so that their planes shall be at right angles to one another, one end of the one spring being fixed within the tube and the free end of the other spring being capable of scanning the whole of the image and of varying the current of the photo-electric cell according to the light that falls upon it, and means for vibrating the compound spring in two directions at right angles to one another in such a manner that the frequency of the vibrations in one direction shall be substantially greater than the frequency of the vibrations in the other direction.

5. An apparatus as claimed in claim 4, in which the free end of the compound spring is photo-electrically sensitized.

6. An apparatus for electrically transmitting images as claimed in claim 4, and having a perforated diaphragm in front of the free end of the compound spring and means for supporting the said diaphragm on the free end of the compound spring.

7. An apparatus for electrically transmitting images as claimed in claim 4, and having a perforated diaphragm in front of the free end of the compound spring, a coating of photo-electric substance on the free end of the compound spring, and means for supporting the diaphragm on the said free end of the compound spring.

8. An apparatus for electrically transmitting images, as claimed in claim 4, and having a perforated diaphragm in front of the free end of the compound spring, a coating of photo-electric substance on the free end of the compound spring, and means for supporting the perforated diaphragm on the said free end of the compound spring, the said perforated diaphragm being made of metal and serving as the anode of the photo-electric cell.

In testimony whereof I have signed my name to this specification.

BORIS RTCHEOULOFF.